United States Patent Office 3,338,942
Patented Aug. 29, 1967

3,338,942
PREPARATION OF ARALKOXY ALUMINUM COMPOUNDS
Allan J. Lundeen, Ponca City, Okla., assignor to Continental Oil Company, Ponca City, Okla., a corporation of Delaware
No Drawing. Filed Feb. 26, 1963, Ser. No. 261,205
14 Claims. (Cl. 260—448)

This invention relates to the preparation of aromatic substituted primary and secondary alcohols, and is more particularly concerned with the preparation of such alcohols by the reaction of certain epoxide compounds and organoaluminum compounds with selected aromatic compounds.

It has heretofore been known to prepare aromatic substituted primary and secondary alcohols by condensing an alkylene oxide compound with an aromatic Friedel-Crafts reactant, with such condensation being effected in the presence of a suitable anhydrous metal halide Friedel-Crafts catalyst. Such Friedel-Crafts reactions for producing the aromatic alcohols are, however, possessed of the disadvantage of by-product contamination rendering separation and purification of the alcohol product difficult. Dark gummy and tarry substances are frequently produced which present special problems in separating and purifying the product. Moreover, the Friedel-Crafts synthesis of such alcohols usually is characterized by relatively low yields and also by the difficulty which is encountered in closely controlling reaction rates and temperatures.

It is the principal object of the present invention to provide a new method of preparing aromatic substituted primary or secondary alcohols.

It is another object of the present invention to provide a more reliable and less expensive method for preparing aromatic substituted primary and secondary alcohols in good yield.

These objects and advantages, in addition to others, will become apparent from the following discussion.

In a broad vein, the invention may be described as comprising the reaction of three compounds, followed by hydrolysis of the reaction products. (The hydrolysis step can be omitted should the aluminum alcoholate product be desired instead of the alcohol.) The three compounds which enter into the reaction may be broadly described as (a) An epoxide compound having the formula:

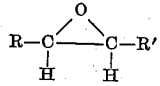

where R and R' are selected from the group consisting of hydrogen and hydrocarbon radicals. Although R and R' can be any hydrocarbon radical, preferably they are radicals of 1 to about 20 carbon atoms and have a total carbon content not exceeding about 22 carbon atoms.

(b) An organoaluminum compound having the formula $AlR_1R_2R_3$ where $R_1$, $R_2$ and $R_3$ are alkyl radicals of less than about 12 carbon atoms which can be alike or different, with the further provision that the total carbons in the alkyls do not exceed about 18 carbon atoms; and (c) An aromatic compound having the formula:

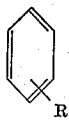

wherein $R_4$ is selected from the group consisting of hydrogen and non-meta, that is, an ortho-para directing substituents such as hydrocarbon radicals whereby the susceptibility of the benzene ring to electrophilic substitution is maintained or increased but not decreased by said substituents. The phenyl ring therefore must be free of polar groups.

Considering more specifically each of the reactants employed in the process of the invention, a variety of epoxide compounds may be utilized, including, but not limited to the following illustrative examples:

ethylene oxide
propylene oxide
1,2-epoxy butane
1,2-epoxy pentane
1,2-epoxy heptane
1,2-epoxy hexane
1,2-epoxy octane
1,2-epoxy nonane
1,2-epoxy decane
1,2-epoxy undecane
1,2-epoxy dodecane
1,2-epoxy hexadecane
1,2-epoxy octadecane, etc.
2,3-epoxy butane
2,3-epoxy pentane
2,3-epoxy hexane
3,4-epoxy hexane
4,5-epoxy heptane
4,5-epoxy octane
5,6-epoxy nonane
1,2-epoxy dodecane
3,4-hexadecane
1,2-eicosane
1,2-epoxy-3-methylbutane
2,3-epoxy-4-ethylhexane
2,3-epoxy-4-methyl-6-ethylnonane
3,4-epoxy-5,6-dimethylundecane
2-methyl-3,4-epoxy-7-ethyldodecane
1,2-epoxy-5-phenyloctane
1,2-epoxy-2-phenylethane
1,2-epoxy-1,2-diphenylethane
3-cyclohexyl-1,2-epoxy decane
4-ethylcyclohexyl-1,2-epoxy octadecane
4-butylphenyl epoxy ethane It will be noted that the foregoing examples of epoxides which may be employed in the reaction include alkyl, cycloalkyl, aryl, alkaryl and aralkyl substituted ethylene oxides. Other alkyl, cycloalkyl, aryl, alkaryl and aralkyl substituted ethylene oxides coming within the generic formula described above can, of course, also be utilized. The preferred compounds for use in the reaction are, however, aliphatic substituted ethylene oxides in which the carbons of the epoxy group are attached to a straight chain or branched chain aliphatic group rather than being attached to a ring structure either an aromatic ring or an alicyclic ring. Most preferred are those wherein R and R' are straight chain alkyl radicals.

The preferred epoxides may be graphically explained by presenting the generic structure by two formulas based on product as follows:

(1) Those which produce primary alcohols have the formula:

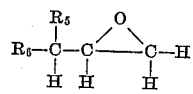

(2) Those which produce secondary alcohols have the formula:

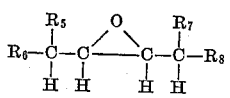

Among the compounds defined by these formulae, those are most preferred in which $R_5$, $R_6$, $R_7$ and $R_8$ are selected from the group consisting of hydrogen and straight or branched chain alkyl radicals of 1 to 20 carbon atoms with the further provision that the total carbons in the alkyls cumulatively do not exceed about 22 carbon atoms.

It may also be noted here that although the present process is, as previously indicated, effective to produce secondary alcohols when both the carbon atoms of the epoxy group of the epoxide reactant carry hydrocarbon radicals of the type described, the usefulness of such secondary alcohols is less than that of the primary alcohols. Therefore, it will be preferred in most instances to utilize epoxides in which only one of the carbon atoms of the epoxy group has hydrogen thereof substituted by a hydrocarbon radical or group. Of course, in producing the primary alcohols, the simple, unsubstituted ethylene oxide may be used to excellent advantage if desired.

Since the specific organoaluminum employed does not affect product structure as the alkyl radicals in the organoaluminum are not incorporated into the product molecule, economics will generally be the determining factor in the selection of this reactant. However, a preferred group of alkylaluminum compounds are those in which the aluminum atom carries three straight chain alkyl substituents (although branch chained can be employed), each of which contains, inclusively, between 2 and about 12 carbon atoms. More preferably each alkyl contains not more than about 4 carbon atoms in such a trialkylaluminum. There are advantages in using those wherein the three alkyl radicals are alike, but this is not necessary. A major advantage of using aluminum alkyls of 2 to 4 carbons per alkyl is economics, but also, such provides a reduction in the number of different reaction products which must be separated following the reaction as will be apparent from reference to the reaction equations set forth hereinafter. The alcohol yields and reaction rate are generally greater when the aluminum atom is substituted by the shorter chained alkyl radicals. Triethylaluminum is the most preferred organoaluminum reactant.

Examples of alkylaluminum compounds which may be employed in the reaction are triethylaluminum, tri-n-propylaluminum, tri-(isopropyl) aluminum, tri-n-butylaluminum, tri-(isobutyl) aluminum, tripentylaluminum, trihexylaluminum, ethyldioctylaluminum, ethyldibutylaluminum, butylpentylhexylaluminum, diethyldodecylaluminum, propylpentyldecylaluminum, ethylheptylnonylaluminum, and butyl (isobutyl) heptylaluminum.

With respect to the aromatic compound used in the reaction, this reactant too may vary considerably in composition. An overriding consideration limiting the molecular structure of the compound is, however, the requirement that the aromatic ring not be substituted by a polar group, or otherwise stated by an atom or functional group which is meta directing or "electron withdrawing" to the extent of making the ring less susceptible to electrophilic substitution than benzene. In other words, aromatic compounds which undergo substitution at the ring as easily as does benzene are operable in the process of the present invention, whereas those which do not will not become bonded to the epoxy functional group of the epoxide compound in sufficient amount to yield practical amounts of the desired alcohols. From this definition of suitable aromatic compounds for use in the invention, those skilled in the art will appreciate that, in addition to benzene, such ortho-para director substituted aromatic compounds as toluene and other alkyl substituted benzenes, preferably wherein the alkyl contains from 1 to about 20 and more, preferably from 1 to about 12 carbon atoms, aryl substituted benzenes, cyclic and polycyclic aromatic compounds (preferably where the cyclic ring contains about 4 to 6 carbon atoms) are all suitable for use in the process. Amino, nitro, hydroxy, alkoxy and halogen substituted benzenes are not suitable. Specific illustrative examples of those substituted benzenes which are not suitable are: nitrobenzene, chlorobenzene, bromobenzene, phenol, benzene acetonitrile, aniline, aniline oxalate, aniline hydrochloride, biphenylamine, and ethoxybenzene.

Specific examples of aromatic compounds which may be employed include benzene, toluene, ethyl benzene, propyl benzene, hexyl benzene, dodecyl benzene, 3-methyl-1-phenylbutane, 4-methyl-1-phenylpentane, 2-methyl-1-phenylpropane, phenylbenzene, 1-benzyl-4-phenylbenzene, o-phenyltoluene, naphthalene, tetrahydronaphthalene (or tetralin).

The reactions of the process may be represented by the following general illustrative equation:

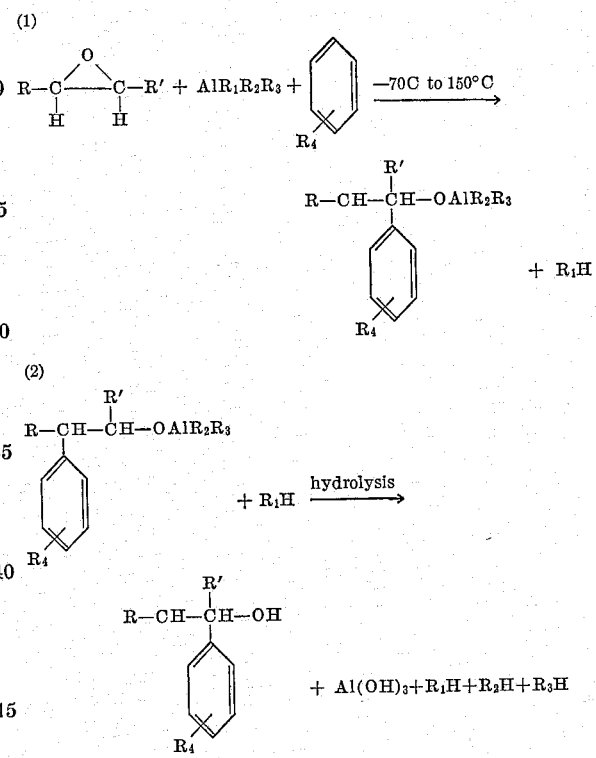

where R, R', $R_1$, $R_2$, $R_3$ and $R_4$ have the meanings assigned hereinbefore.

The broad temperature range over which the process is generally to be conducted to produce the desired alcohol products is about $-70°$ C. to $150°$ C. Within this range I prefer to use temperature of between $0°$ C. and $100°$ C., since considerably improved yields are realized when the reaction is so carried out. When operating in the broad temperature range, an important critical factor to consider is the decomposition temperature of the particular alkyl aluminum compound which is utilized.

The pressure can be atmospheric, subatmospheric or superatmospheric, but atmospheric is most convenient and preferred. Of course, as is well known to those skilled in organoaluminum chemistry, the reaction should be run in an inert atmosphere such as nitrogen whereby oxygen and moisture are avoided. In fact the whole system should be anhydrous.

The hydrolysis of aluminum alcoholates is well known in the art and the hydrolysis of these can be effected in the conventional manners. Briefly, this is usually accomplished by aqueous solution of mineral acids or bases such as HCl, $H_2SO_4$, NaOH and KOH; however, water (usually as steam) or alcohols such as methanol may be employed.

Following are specific non-limiting examples set forth to illustrate the invention.

Example 1

700 ml. of toluene and 460 grams of triethylaluminum were placed in a 3 liter flask equipped with a stirrer, addition funnel and thermometer. 120 grams of propylene oxide was added to this mixture over a period of 1 hour while maintaining the contents of the flask at 20° C. The mixture was then hydrolyzed, utilizing 1.5 liters of 30% hydrochloric acid. The organic phase of the hydrolyzed mixture was then dried with anhydrous potassium carbonate and distilled. The main fraction of the organic phase had a boiling range of 126° C. to 130° C. at a pressure of 20 mm. of mercury. Analysis of the main fraction indicated the material of this fraction to be primarily 2-(p-tolyl)-1-propanol. Some 2-(o-tolyl)-1-propanol was also present. The yield realized was 61% of theory.

Example 2

100 ml. of dry benzene and 11.5 ml. of triethylaluminum were placed in a 500 ml. flask. 0.08 mole of ethylene oxide was added slowly while the reaction temperature was maintained at about 40° C. Following the reaction, hydrolysis and distillation yielded 7 grams of a material boiling from 200° C. to 220° C. This material was identified as β-phenylethanol by gas chromatography and by conversion to its phenylurethane derivative. One ml. of the reaction product was mixed with 0.5 ml. of phenylisocyanate and warmed for 10 minutes on a steam bath. Crystallization from benzene-hexane solvent yielded 0.42 gram of the phenylurethane of β-phenylethanol.

Additional examples of specific reactants and therefore products obtainable by this reaction are as follows:

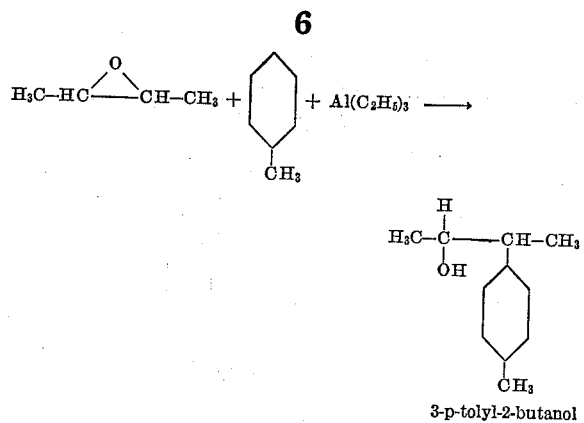

3-p-tolyl-2-butanol

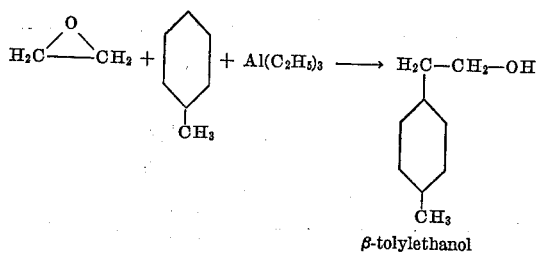

β-tolylethanol

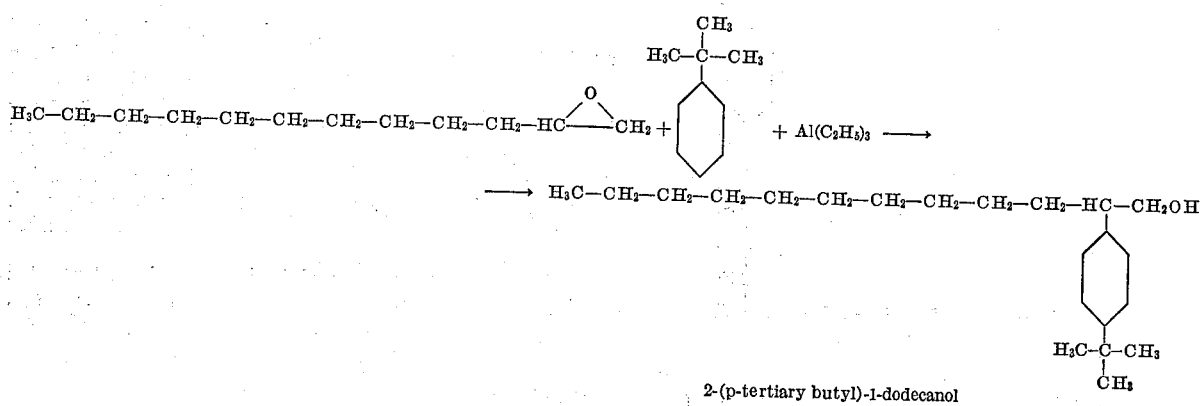

2-(p-tertiary butyl)-1-dodecanol

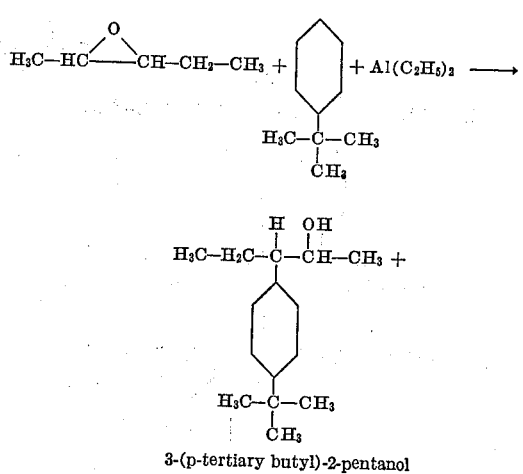

3-(p-tertiary butyl)-2-pentanol

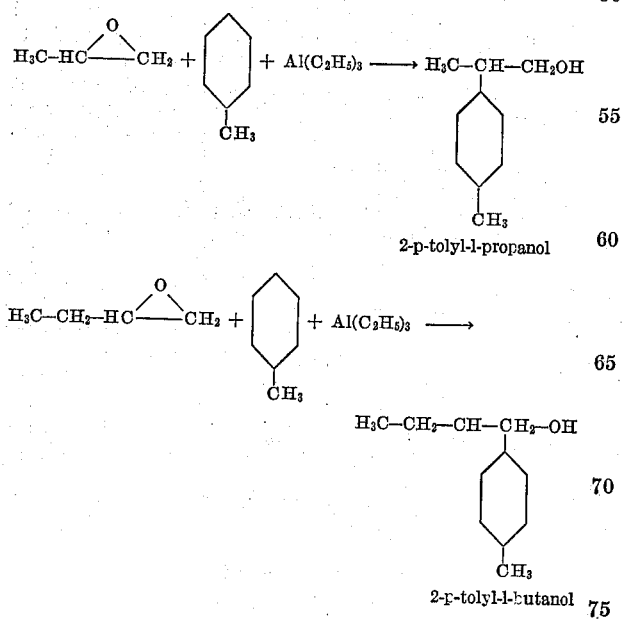

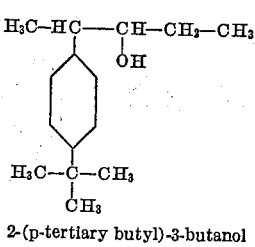

2-(p-tertiary butyl)-3-butanol

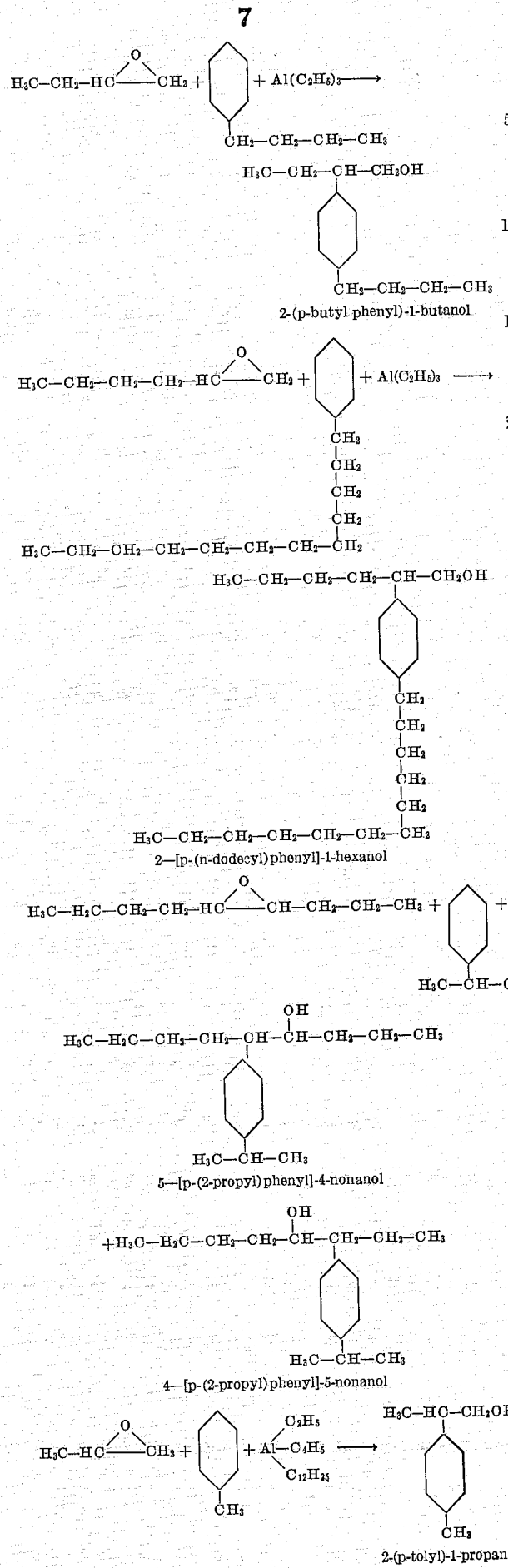

The foregoing examples verify to those skilled in the art that both carbon atoms of the ethylene oxide group in the illustrative equation and formulae can be attacked and the aromatic substituent ultimately attached thereto as will have been apparent to them. Where the substituted ethylene oxide is not a symmetric molecule, this will result in the formation of two distinguishable isomeric alcohols. This, of course, only occurs in the case of the disubstituted ethylene oxides and where the product is secondary alcohols as only one product is obtained when the oxirane compound is substituted on only one carbon atom and whereby primary alcohols are produced.

With regard to the amount of the various reactants, it will be apparent from the equations hereinabove that the oxirane compound, the organoaluminum and the aromatic compound react in a ratio of 1:1 in all respects. Although the amount of the feed components to be employed is not critical, an excess of the aromatic is preferred, that is, more than the 1:1:1 ratio indicated by the stoichiometric equation. The use of an excess merely constitutes a preferred manner of operation and no specific amount of excess is required, although usually an excess on the order of about 1½:1:1 to about 10:1:1 will be found as the amount desired in practice. It suffices to point out that some excess of the aromatic is preferred, and those skilled in the art will then have no difficulty in ascertaining the most preferred amount of excess of aromatic for any particular occasion.

From the foregoing discussion of the invention and from the examples set forth, it will be apparent that the present invention provides a convenient and economical method for preparing a great variety of aromatic substituted primary and secondary alcohols. Variation in the molecular structure of the alcohol products may be effected by varying either the composition of the epoxide compound, or the composition of the aromatic compound, or both, as will have become apparent from the foregoing discussion.

Moreover, the process of the invention is well adapted for integration with certain other processes. For example, it is possible to prepare a trialkylaluminum by the growth reaction for use in the process and/or to prepare an olefin by the displacement reaction from which olefin the epoxide or oxirane compound can be prepared. Such reactions as the formation of alkylaluminums, the growth reaction, and the displacement reaction are well known in the art. Their applicability to this process, however, is pointed out to show the enhanced commercial possibilities of the present invention. Naturally, the growth process is not the only suitable method available for preparing the desired alkylaluminum. Alkylaluminums prepared by other methods are also suitable.

It will be apparent to those skilled in the art that the materials, proportions and reaction conditions referred to herein by way of example are capable of wide variation without departure from the spirit of the invention, and further, that the specific terms utilized herein are used descriptively rather than in a limiting sense, the scope of the invention being defined in the following claims:

What we claim as new and desire to secure by Letters Patent is:

1. The process of preparing aralkoxy aluminum compounds which comprises reacting together in an inert atmosphere:

(I) an epoxide compound having the formula:

$$R-\overset{O}{\underset{H}{C}}\!\!-\!\!-\!\!\overset{}{\underset{H}{C}}-R'$$

where R and R' are selected from the group consisting of hydrogen and hydrocarbon radicals;

(II) an organoaluminum compound having the formula:

$$AlR_1R_2R_3$$

where $R_1$, $R_2$ and $R_3$ are alkyl radicals of less than about 12 carbon atoms; and (III) an aromatic compound having the formula:

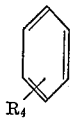

wherein $R_4$ is selected from the group consisting of hydrogen and ortho-para directing substituents with the provision that the substituted benzene is equal to benzene in its ease of electrophilic substitution; and recovering an aralkoxy aluminum compound.

2. The process of preparing aralkoxy aluminum compounds which comprises reacting together in an inert atmosphere:

(I) an epoxide compound having the formula:

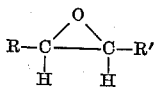

where R and R' are selected from the group consisting of hydrogen, alkyl, cycloalkyl, alkaryl and aralkyl radicals of 1 to about 20 carbon atoms with provision that the total carbon atoms in said radicals does not exceed about 22 carbon atoms;

(II) an organoaluminum compound having the formula:

$$AlR_1R_2R_3$$

where $R_1$, $R_2$ and $R_3$ are alkyl radicals of 2 to about 12 carbon atoms with the provision that the alkyl radicals cumulatively contain no more than about 18 carbon atoms; and (III) an aromatic compound having the formula:

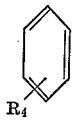

wherein $R_4$ is selected from the group consisting of hydrogen, alkyl, cycloalkyls joined by at least one carbon atom and aryl radicals joined by at least one carbon atom at a temperature in the range of about $-70$ to about $150°$ C.; and recovering an aralkoxy aluminum compound.

3. A process according to claim 2 characterized further in that said compounds are reacted at a temperature varying in the range of from 0 to 100° C.

4. A process according to claim 3 wherein the aromatic compound is one in which R represents an alkyl radical of 1 to about 20 carbon atoms.

5. The process of preparing aralkoxy aluminum compounds having an aromatic substituent in the 2-position according to claim 2 wherein R' in the epoxide is hydrogen.

6. A process according to claim 5 wherein the aromatic compound is benzene.

7. The process of preparing aralkoxy aluminum compounds according to claim 5 wherein $R_1$, $R_2$ and $R_3$ in the alkyl aluminum are alkyl radicals of 2 to about 4 carbon atoms.

8. The process of preparing aralkoxy aluminum compounds according to claim 7 wherein R is an alkyl radical of 1 to about 20 carbon atoms.

9. A process according to claim 7 wherein the aromatic compound is benzene.

10. The process of preparing aralkoxy aluminum compounds according to claim 2 wherein in the epoxide R and R' are both hydrocarbon radicals.

11. The process of preparing aralkoxy aluminum compounds according to claim 10, wherein $R_1$, $R_2$ and $R_3$ in the alkyl aluminum are alkyl radicals of 2 to about 4 carbon atoms and wherein said aromatic compound is benzene.

12. The process according to claim 11 wherein both R and R' are aliphatic hydrocarbon radicals which have a total carbon content of not more than about 22 carbon atoms.

13. The process of preparing a 2-(p-tolyl)-1-propoxy aluminum compound which comprises:

(a) reacting propylene oxide with toluene and triethylaluminum while maintaining the reaction mixture at a temperature of about 20° C.; then (b) recovering said compound.

14. The process of preparing a β-phenoxy aluminum compound which comprises:

(a) reacting ethylene oxide with benzene and triethylaluminum while maintaining the reaction mixture at a temperature of about 40° C.; and then (b) recovering said compound.

References Cited

UNITED STATES PATENTS

| 3,024,287 | 3/1962 | Kennedy et al. | 260—618 |
| 3,091,627 | 5/1963 | Rudner | 260—632 |

FOREIGN PATENTS

| 1,278,920 | 11/1961 | France. |
| 877,138 | 9/1961 | Great Britain. |
| 923,131 | 4/1963 | Great Britain. |

TOBIAS E. LEVOW, *Primary Examiner.*